Jan. 26, 1965     J. C. BRONSON     3,167,695
LIQUID LEVEL CAPACITANCE PROBE
Filed Oct. 20, 1961
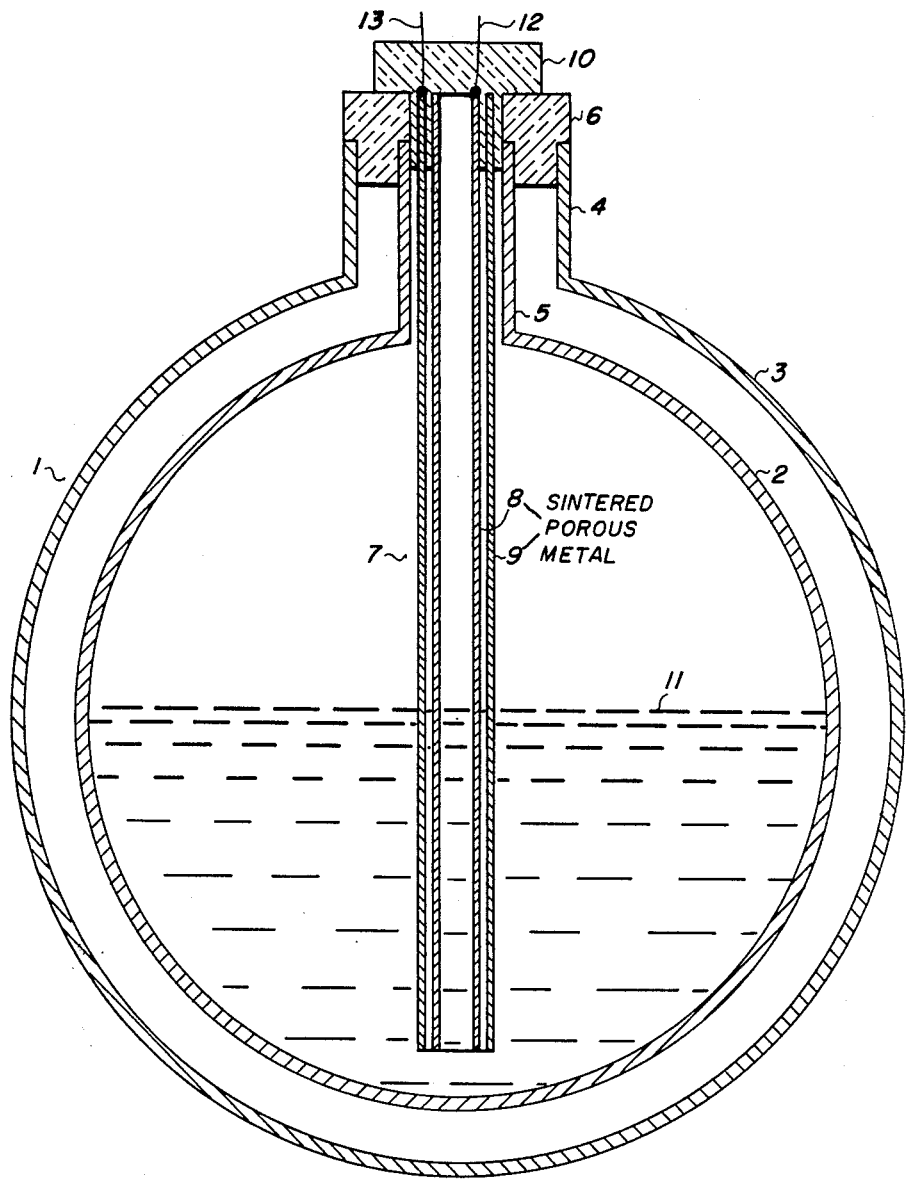
WITNESSES:
INVENTOR.
John C. Bronson
BY 3,167,695
LIQUID LEVEL CAPACITANCE PROBE
John C. Bronson, Los Alamos, N. Mex., assignor to the United States of America as represented by the United States Atomic Energy Commission
Filed Oct. 20, 1961, Ser. No. 146,666
2 Claims. (Cl. 317—246)

This invention relates to liquid depth gage systems of the electrical remote reading type employing an immersed capacitor whose capacitance varies with liquid depth.

The invention relates to a means for correcting erroneous readings in concentric tube capacitance liquid level gages caused by differential pressures, temperatures, and pulsing of columns.

At present when a warm storage Dewar is filled with a cryogenic fluid (20°–77° K.) effervescence and rapid boiling occur in the Dewar and the warm tubes of the capacitance gage with the consequent generation of a tremendous volume of gas. If this gas doesn't escape from the capacitor tubes rapidly enough, it causes the liquid levels in the Dewar and the capacitor tubes to vary, thus giving a false liquid level reading. The present method of venting the gas produced in the capacitor tubes is by holes in the upper portion of the capacitor tubes above the full liquid line, see for example, U.S. Patent 2,882,728. It has been found that gas cannot be vented from the capacitor tubes by this method fast enough to stop surging and differential pressures without destroying the homogeneous, concentric, electrostatic field necessary for accurate operation of the gage.

Attempts to put holes throughout the length of the capacitor tubes to relieve the column pressures result in multiplying the electronic fringe effects and destroying gage accuracy. Fabricating the upper portion of the capacitor tubes from screen or expanded metal has been found unsatisfactory from a structural standpoint and does not solve the problem of temperature gradients and varying densities within the probe.

This invention relates specifically to fabricating the concentric capacitance probe tubes from a sintered porous material. It is preferred that a sintered metal of about 50% voids, such as is used in filtering media, be used.

The construction of the probe from a sintered porous metal will allow gas venting at any level and this free transfer will allow a steady temperature across the gage and a consequent constant liquid density and liquid level in the tubes and Dewar. Having a constant liquid density and liquid level in the probe and Dewar at liquid level means a consequent dielectric constant of the contained liquid that accurately represents conditions within the Dewar. In addition, the use of sintered metal will represent as appreciable cut in the heat leak in the system.

An object of the invention is to provide an improved capacitor construction and in particular one especially suitable for use in a container for liquefied gas.

A specific object is to provide a novel liquid level capacitance probe that is especially adapted for use with liquefied gases. The probe is constructed from a sintered porous material which allows a free transfer of gas through said material whereby false readings caused by varying liquid levels caused by the effervescence and rapid boiling of the liquefied gas in contact with the warm Dewar and the warm tubes of the capacitance probe are eliminated.

The foregoing and other objects, purposes and advantages of the invention will appear more fully from consideration of the detailed description which follows, in conjunction with the accompanying drawing wherein the invention is illustrated. It is to be expressly understood, however, that the drawing is for the purposes of illustration and description, and is not to be construed as defining the limits of the invention.

In the drawing:

The FIGURE is a partly diagrammatical cross-sectional showing of a container for liquefied gas and the novel liquid level capacitance probe of the present invention.

The liquefied gas container 1 does not include various elements and parts which are employed in standard commercial units of this type, since such parts are not relevant to the invention. These parts are omitted for the fact of clarity; however, it is understood that the container 1 and associated elements will be provided in practice with parts and accessories required for efficient operation and well known to those skilled in the art.

In the simplified form shown in FIGURE 1, container 1 includes an inner shell 2 and an outer shell 3 of similar shape and spaced from the inner shell, the intervening space preferably being evacuated. Inner shell 2 may be fabricated from aluminum, stainless steel, or glass. Outer shell 3 may be fabricated from carbon steel, aluminum, brass, or glass. A cylindrical neck 4 extends upwardly from outer shell 3 and is spaced from cylindrical neck 5 which extends upwardly from inner shell 2. The space between necks 4 and 5 is sealed by a downward extension of cap 6, of insulating material.

The liquid level capacitance probe 7 is inserted through the center of cap 6 and extends substantially to the bottom of inner shell 2. Capacitor probe 7 consists of a central tube 8 and a concentric outer tube 9 uniformly spaced from said tube 8. The capacitance probe 7 is mounted in uniformly spaced relation at the upper ends in plug 10, which is fitted into cap 6. An electrical connection is provided from the capacitance probe 7 to an electrical circuit for indicating the level of liquid 11. The electrical connection may consist, for example, of wires 12 and 13 which may be brought out through plug 10.

The electrical circuit for indicating the liquid level may include any one of various circuits well known to those skilled in the art, see for example, those indicated in U.S. Patent Nos. 2,807,956 and 2,882,728.

In the preferred embodiment of the present invention, the tubes 8 and 9 of the capacitance probe 7 are fabricated from a sintered porous metal such as stainless steel. The preferred material will have approximately 50% voids. If means were not provided for free transfer of the gas generated within capacitance probe tubes 8 and 9 and the Dewar ullage space, the differential pressures between the interior of the tubes and the exterior of the tubes, within the Dewar, would give a false liquid level reading. The best known present method, up to the advent of the present invention, of venting the gas generated within the capacitor tubes is by means of holes in the upper portion of said tubes. It has been found that gas can not be vented fast enough by using this method to stop surging and differential pressures without destroying the homogeneous, concentric, electrostatic field necessary for accurate operation of the gage.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. In a liquid level capacitance probe for liquefied gases comprising two concentric tubes which form the capacitor and means for connecting said concentric tubes to an electrical capacitance indicating circuit, the improvement consisting of said two concentric tubes being constructed from sintered porous metal having approximately 50% voids whereby a free transfer of gas may occur through said material.

2. In a system for measuring a varying amount of liquefied gas comprising a double walled container, two concentric metal tubes forming a liquid level capacitance probe disposed within said container, means for connecting said probe to an electrical capacitance measuring circuit, the improvement consisting of said two concentric metal tubes being fabricated from sintered, porous, stainless steel having approximately 50% voids.

References Cited by the Examiner
UNITED STATES PATENTS

| | | | |
|---|---|---|---|
| 2,752,543 | 6/56 | Smith | 317—246 |
| 2,882,728 | 4/59 | Zito | 73—304 |
| 3,050,386 | 8/62 | Von Dohren et al. | 29—182 |

OTHER REFERENCES

"National Bureau of Standards Technical News Bulletin," vol. 38, January 1954, pp. 3–4.

JOHN F. BURNS, *Primary Examiner*.